United States Patent [19]
Park et al.

[11] 4,375,533
[45] Mar. 1, 1983

[54] POLYMERIZATION PROCESS FOR CARBOXYL CONTAINING POLYMERS

[75] Inventors: Hung S. Park, Avon Lake; August H. Jorgensen, Jr., Rocky River, both of Ohio

[73] Assignee: The BF Goodrich Company, Akron, Ohio

[21] Appl. No.: 281,535

[22] Filed: Jul. 8, 1981

[51] Int. Cl.$^3$ .............................................. C08F 22/04
[52] U.S. Cl. ....................................... 526/193; 526/74; 526/89; 526/216; 526/269; 526/317
[58] Field of Search ................... 526/74, 89, 193, 216, 526/269, 317

[56] References Cited

U.S. PATENT DOCUMENTS 3,957,739  5/1976  Cabestany et al. ................. 526/317
4,062,817  12/1977  Westerman ......................... 526/317
4,190,562  2/1980  Westerman ......................... 526/317

Primary Examiner—Harry Wong, Jr.
Attorney, Agent, or Firm—J. Hughes Powell, Jr.

[57] ABSTRACT

A method for polymerizing olefinically unsaturated carboxylic acids containing at least one activated carbon to carbon olefinic double bond and at least one carboxyl group in an organic media in which said carboxylic acid is at least partially soluble, and a nonsolvent for the polymers of said carboxylic acid, in the presence of a free radical forming catalyst and a surface active agent having an HLB value in the range of less than 10.

12 Claims, No Drawings

POLYMERIZATION PROCESS FOR CARBOXYL CONTAINING POLYMERS

BACKGROUND OF THE INVENTION

Carboxyl containing polymers of vinylidene monomers containing at least one terminal $CH_2{<}$ group are well known. Such polymers may be homopolymers, or copolymers with other vinylidene monomers, of unsaturated polymerizable carboxylic acids such as acrylic acid, methacrylic acid, maleic acid, itaconic acid and the like. Often copolymers of these acids are cross-linked with small amounts of cross-linking agents, which in the form of their salts absorb large quantities of water or solvents. These materials are normally prepared by polymerization with a free radical catalyst in an organic medium in a closed vessel or autoclave equipment with stirring. During the course of such polymerizations, shortly after the initiation of polymerization, polymer begins to precipitate from the solution as it is formed and flocculates and forms aggregates. This aggregation is generally uncontrolled and interferes with the polymerization reaction by retarding access of monomer to free radicals and contributing to poor removal of heat of polymerization. As a consequence, it is difficult to obtain uniform polymerizations because of the variation and aggregation, which often becomes worse when there is local variation of temperature in different reactor regions and variation of product quantity from lot to lot is obtained. Further, the precipitated polymer forms a slurry in the solvent which becomes extremely thick, results in ineffective mixing, and generally causes extensive fouling on reactor surfaces of polymer build-up. A further problem is that solvent is trapped in the polymers during aggregation and removal of such trapped solvent is time consuming, decreases production rates and makes it difficult to obtain dried carboxyl containing products having less than 500 ppm of residual medium in the polymer product.

SUMMARY OF THE INVENTION

An improved polymerization process for preparing carboxyl containing polymers of vinylidene monomers containing at least one terminal $CH_2{<}$ group is obtained when such polymerizations are conducted in an organic medium which is a solvent for the monomer but a non-solvent for the polymer, wherein the solubility parameter of the solvent ranges from about 5 to about 10 $(cal/cm^3)^{\frac{1}{2}}$ and the solvents have dielectric constants of 1.7 to 9.5, and in the presence of a surface active agent having an HLB value in the range of less than 10. Under these reaction conditions, polymer build-up is reduced, particle size of the precipitated polymer is controlled, better heat transfer is obtained, higher total solid reactions may be reached, and the result in products have improved drying properties and less residual solvent.

DETAILED DESCRIPTION

The carboxyl containing polymers are prepared from vinylidene monomers containing at least one terminal $CH_2{<}$ group. Such polymers may be homopolymers or copolymers of an unsaturated, polymerizable carboxylic monomer such as acrylic acid, maleic acid, itaconic acid and the like, or copolymers thereof. Typical materials are those described in U.S. Pat. No. 2,798,053. Copolymers, for example, include copolymers of acrylic acid with small amounts of polyalkenyl polyether cross-linkers that are gel-like polymers, which, especially in the form of their salts, absorb large quantities of water or solvents with subsequent substantial increase in volume. Other useful carboxyl containing polymers are described in U.S. Pat. No. 3,940,351, directed to polymers of unsaturated carboxylic acid and at least one acrylic or methacrylic ester where the alkyl group contains 10 to 30 carbon atoms. Other types of such copolymers are described in U.S. Pat. No. 4,062,817 wherein the polymers described in U.S. Pat. No. 3,940,351 contain additionally another acrylic or methacrylic ester and the alkyl groups contain 1 to 8 carbon atoms.

The carboxyl containing polymers have molecular weights greater than about 500 to several million, usually greater than about 10,000 to 900,000 or more. Carboxylic polymers and copolymers such as those of acrylic acid, methacrylic acid, maleic acid, or the anhydrides thereof also may be cross-linked with divinyl benzene, unsaturated diesters and the like as is disclosed in U.S. Pat. Nos. 2,340,110; 2,340,111 and 2,533,635.

These materials are normally prepared in organic media as hydrocarbons and chlorinated hydrocarbons, for example, benzene, xylene, tetralin, hexane, heptane, carbon tetrachloride, methyl chloride, ethyl chloride and the like. Polymerizations are disclosed, for example, in U.S. Pat. No. 4,062,817 wherein the polymerizations are desirably conducted in the presence of haloethane or halomethane, preferably containing at least 4 halogen atoms, for example, 1,1,2-trichloro-1,2,2-trifluoroethane. Other carboxyl containing polymers prepared in similar systems include those described in U.S. Pat. Nos. 3,915,921 and 4,066,583. Preferably solvents are used that are solvents for the monomers, but non-solvents for the polymers.

The carboxylic monomers useful in the production of the polymers of this invention are the olefinically-unsaturated carboxylic acids containing at least one activated carbon-to-carbon olefinic double bond, and at least one carboxyl group; that is, an acid containing an olefinic double bond which readily functions in polymerization because of its presence in the monomer molecule, either in the alpha-beta position with respect to a carboxyl group, $-C{=}C{-}COOH$; or as a part of a terminal methylene grouping $CH_2{=}C{<}$. Olefinically-unsaturated acids of this class include such materials as the acrylic acids typified by the acrylic acid itself, methacrylic acid, ethacrylic acid, alpha-chloro-acrylic acid, alpha-cyano acrylic acid, beta methyl-acrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, citraconic acid, mesaconic acid, glutaconic acid, aconitic acid, maleic acid, fumaric acid, and tricarboxy ethylene. As used herein, the term "carboxylic acid" includes the polycarboxylic acids and those acid anhydrides, such as maleic anhydride, wherein the anhydride group is formed by the elimination of one molecule of water from two carboxyl groups located on the same polycarboxylic acid molecule. Maleic anhydride and other acid anhydrides useful herein have the general structure

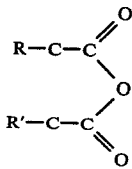

wherein R and R' are selected from the group consisting of hydrogen, halogen and cyanogen (—C≡N) groups and alkyl, aryl, alkaryl, aralkyl, and cycloalkyl groups such as methyl, ethyl, propyl, octyl, decyl, phenyl, tolyl, xylyl, benzyl, cyclohexyl, and the like.

The preferred carboxylic monomers for use in this invention are the monoolefinic acrylic acids having the general structure:

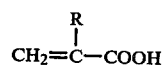

wherein R is a substituent selected from the class consisting of hydrogen, halogen, and the cyanogen (—C≡N) groups, monovalent alkyl radicals, monovalent aryl radicals, monovalent aralkyl radicals, monovalent alkaryl radicals and monovalent cycloaliphatic radicals. Of this class, acrylic and methacrylic acid are most preferred because of generally lower cost, ready availability and ability to form superior polymers. Another useful carboxylic monomer is maleic anhydride or the acid.

The polymers contemplated include both homopolymeric carboxylic acids or anhydrides thereof, or the defined carboxylic acids copolymerized with one or more other vinylidene monomers containing at least one terminal $CH_2<$ group. Such materials include, for example, acrylic ester monomers including those acrylic ester monomers having long chain aliphatic groups such as derivatives of an acrylic acid represented by the formula

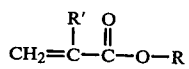

wherein R is an alkyl group having from 10 to 30 carbon atoms, preferably 10 to 20 carbon atoms and R' is hydrogen or a methyl or ethyl group, present in the copolymer in amount, for example, from about 1 to 30 weight percent, and for some uses more preferably, about 5 to 15 weight percent. Representative higher alkyl acrylic esters are decyl acrylate, isodecyl methacrylate, lauryl acrylate, stearyl acrylate, behenyl acrylate and melissyl acrylate and the corresponding methacrylates. Mixtures of two or three or more long chain acrylic esters may be successfully polymerized with one of the carboxylic monomers. One useful class of copolymers are those methacrylates where the alkyl group contains 16 to 21 carbon atoms. Typical polymers have been made with 15±5 weight percent isodecyl methacrylate, 10±3 weight percent lauryl methacrylate, 7±3 weight percent stearyl methacrylate, with acrylic acid.

Other acrylic esters contemplated are also derivatives of an acrylic acid used in amounts, for example, of about 5 to 30 weight percent represented by the formula

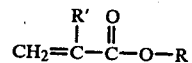

wherein R is an alkyl, alkoxy, haloalkyl, cyanoalkyl, and like groups having from 1 to 9 carbon atoms and R' is hydrogen or a methyl or ethyl group. These acrylic esters are present in the copolymer for some uses in amount from about 5 to 30 weight percent and more preferably from about 5 to 25 weight percent. Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, n-hexyl methacrylate, and the like. Mixtures of these two classes of acrylates provide useful copolymers.

The polymers also may be cross-linked with any polyfunctional vinylidene monomer containing at least 2 terminal $CH_2<$ groups, including for example, butadiene, isoprene, divinyl benzene, divinyl naphthlene, allyl acrylates and the like. Particularly useful cross-linking monomers for use in preparing the copolymers, if one is employed, are polyalkenyl polyethers having more than one alkenyl ether grouping per molecule. The most useful possess alkenyl groups in which an olefinic double bond is present attached to a terminal methylene groups, $CH_2=C<$. They are made by the etherification of a polyhydric alcohol containing at least 4 carbon atoms and at least 3 hydroxyl groups. Compounds of this class may be produced by reacting an alkenyl halide, such as allyl chloride or allyl bromide with a strongly alkaline aqueous solution of one or more polyhydric alcohols. The product is a complex mixture of polyethers with varying numbers of ether groups. Analysis reveals the average number of ether groupings on each molecule. Efficiency of the polyether cross-linking agent increases with the number of potentially polymerizable groups on the molecule. It is preferred to utilize polyethers containing an average of two or more alkenyl ether groupings per molecule. Other cross-linking monomers include for example, diallyl esters, dimethallyl ethers, allyl or methallyl acrylates and acrylamides, tetraallyl tin, tetravinyl silane, polyalkenyl methanes, diacrylates, and dimethacrylates, divinyl compounds as divinyl benzene, polyallyl phosphate, diallyloxy compounds and phosphite esters and the like. Typical agents are allyl pentaerythritol, allyl sucrose, trimethylolpropane triacrylate, 1,6-hexanediol diacrylate, trimethylolpropane diallyl ether, pentaerythritol triacrylate, tetramethylene dimethacrylate, tetramethylene diacrylate, ethylene diacrylate, ethylene dimethacrylate, triethylene glycol dimethacrylate, and the like. Allyl pentaerythritol and allyl sucrose provide excellent polymers in amounts less than 5, as less than 3.0 weight percent.

When the optional cross-linking agent is present, the polymeric mixtures usually contain up to about 5% by weight of cross-linking monomer based on the total of carboxylic acid monomer, plus other monomers, if present and more preferably about 0.1 to 2.0 weight percent.

Other vinylidene monomers may also be used, particularly in conjunction with acrylic esters, including the acrylic nitriles, α,β-Olefinically unsaturated nitriles useful in the interpolymers embodied herein are preferably the monoolefinically unsaturated nitriles having from 3 to 10 carbon atoms such as acrylonitrile, methacrylonitrile, ethacrylonitrile, chloroacrylonitrile, and the like. Most preferred are acrylonitrile and methacrylonitrile. The amounts used are, for example, for some polymers are from about 5 to 30 weight percent of the total monomers copolymerized.

Acrylic amides include monoolefinically unsaturated amides that may be incorporated in the interpolymers of this invention having at least one hydrogen on the amide nitrogen and the olefinic unsaturation is alpha-beta to the carbonyl group. Representative amides include acrylamide, methacrylamide, N-methyl acrylamide, N-t-butyl acrylamide, N-cyclohexyl acrylamide, N-ethyl acrylamide and others. Very much preferred are acrylamide and methacrylamide used in amounts, for example, from about 1 to 30 weight percent of the total monomers copolymerized. Other acrylic amides include N-alkylol amides of alpha, beta-olefinically unsaturated carboxylic acids including those having from 4 to 10 carbon atoms such as N-methylol acrylamide, N-ethanol acrylamide, N-propanol acrylamide, N-methylol methacrylamide, N-ethanol methacrylamide, N-methylol maleimide, N-methylol maleamide, N-methylol maleamic acid, N-methylol maleamic acid esters, the N-alkylol amides of the vinyl aromatic acids such as N-methylol-p-vinyl benzamide, and the like and others. The preferred monomers of the N-alkylol amide type are the N-alkylol amides of alpha, beta-monoolefinically unsaturated monocarboxylic acids and the most preferred are N-methylol acrylamide and N-methylol methacrylamide used in amounts for example of about 1 to 20 weight percent. N-alkoxymethyl acrylamides also may be used. It is thus intended that where references are made herein regarding the essential N-substituted alkoxymethyl amides, the term "acrylamide" includes "methacrylamide" within its meaning. The preferred alkoxymethyl acrylamides are those wherein $R_6$ is an alkyl group containing from 2 to 5 carbon atoms and useful is N-butoxymethyl acrylamide.

These copolymers may include as little as 8 weight percent of the total polymer of a carboxyl containing monomer, up to 100%, i.e. homopolymer. Particularly useful copolymers contain greater than 40 percent acid and preferably greater than 70 weight percent.

Other vinylidene comonomers generally include in addition to those described above, at least one other olefinically unsaturated monomer, more preferably at least one other vinylidene monomer (i.e., a monomer containing at least one terminal $CH_2\!=\!CH\!<$ group per molecule) copolymerized therewith, for example up to about 30% or more by weight of the total monomers. Suitable monomers include α-olefins containing from 2 to 12 carbon atoms, more preferably from 2 to 8 carbon atoms; dienes containing from 4 to 10 carbon atoms including butadiene; vinyl esters and allyl esters such as vinyl acetate; vinyl aromatics such as styrene; vinyl and allyl ethers and ketones such as vinyl methyl ether and methyl vinyl ketone; cyanoalkyl acrylates such as α-cyanomethyl acrylate, the α-, β- and γ-cyanopropyl acrylates, vinyl halides and vinyl chloride, vinylidene chloride and the like; esters of maleic and fumaric acid and the like; divinyls, diacrylates and other polyfunctional monomers such as divinyl ether, diethylene glycol diacrylate, ethylene glycol dimethacrylate, methylene-bis-acrylamide, allylpentaerythritol, and the like; and bis(β-haloalkyl) alkenyl phosphonates such as bis(β-chloroethyl) vinyl phosphonate and the like. Copolymers wherein the carboxyl containing monomer is a minor constituent, and the other vinylidene monomers are present on major components are readily prepared in accordance with the process of this invention.

Polymerization of the monomer in the solvent or diluent medium is usually carried out in the presence of a free radical catalyst in a closed vessel in an inert atmosphere under autogenous pressure or artificially-induced pressure, or in an open vessel under reflux at atmospheric pressure. Temperature of the polymerization may be varied from about 0° to 100° C. or lower or higher, depending to a degree on the molecular weight desired in the polymer. Polymerization at 25° to 90° C. under autogenous pressure using a free radical catalyst is generally effective in producing polymer yields of 75% to 100%. Typical free radical forming catalysts include peroxygen compounds such as sodium, potassium and ammonium persulfates, caprylyl peroxide, benzoyl peroxide, hydrogen peroxide, pelargonyl peroxide, cumene hydroperoxides, tertiary butyl diperphthalate, tertiary butyl perbenzoate, sodium peracetate, sodium percarbonate, and the like, as well as azo catalysts and azodiisobutyryl nitrile, hereinafter referred to as azoisobutyronitrile. Other catalysts utilizable are the so-called "redox" type of catalyst and the heavy-metal activated catalyst systems. Ultra-violet light may also be used as a source of free radicals. Some systems polymerize solely by heat, but catalysts provide better control. The monomer may be batch charged or continuously added during the course of polymerization or by any other manner of polymerization techniques conventionally used.

As stated, the polymerizations are normally conducted in inert diluents having some solubilizing effect on one or more of the monomeric ingredients, but substantially none on the resulting polymers. In other words, the medium used for the polymerization is one in which the monomers are preferably soluble and the polymer is substantially insoluble. Such materials are normally organic liquids which are solvents for the monomers, but nonsolvents for the polymers, or a mixture of such solvent so that the polymer product is preferably obtained as a very fine friable or fluffy precipitate. Typical solvents include hydrocarbon containing 6 to 8 carbon atoms, benzene, xylene, tetralin, hexane, heptane, cyclohexane, carbon tetrachloride, chloroform, trichloroethylene, methyl chloride, ethyl chloride and methylene chloride; chlorofluoroalkanes such as chlorofluoromethane and chlorofluoroethane containing at least four halogen atoms; esters such as methyl acetate, ethyl acetate and butyl propionate; ketones such as methylethylketone, acetone, and dioxane; alcohols including methanol, ethanol, butanol, mineral spirits and the like. The amount of organic medium used normally will be in excess of the monomers to be polymerized and the proportion may vary from at least 1 weight percent of monomers and 99 weight percent organic medium up to about 50 weight percent monomers and 50 weight percent organic medium, more normally a concentration of about 5 to 20 weight percent organic monomers is employed. Excellent results have been obtained with mineral spirits having a flash point greater at 120° F. containing 0 to 2% aromatics; 40 to 85% paraffins and 15 to 50% naphthenes.

In the practice of the invention, any of the general types of nonionic surface active agents or surfactants may be employed. The improvement of the present invention is in the use of a nonionic surfactant or other surface active agent to impart high porosity to the substantially uniform spherical beads of polymer. Nonionic surfactants' emulsifying efficiency is related to the polarity of the molecule, that is, the relation between the contribution of the polar hydrophilic head and the nonpolar lipophilic tail. This polarity for nonionic surfactants is defined in terms of an empirical quantity which is called the hydrophile-lipophile balance of HLB. The HLB is explained and the method of determining the same is set out in "Nonionic Surfactants" edited by Martin J. Shick at page 604–612, published in 1967 by Marcel Dekker, Inc., New York. For the purposes of the present invention, a nonionic surfactant having an HLB in the range of about 1.0 to about 10 is satisfactory. Excellent results have been obtained with an HLB in the range of about 2.0 to about 6.0 to obtain spherical, regular and porous beds of polymer. A very satisfactory range of HLB is from about 1 to about 10 which produces a most desirable porosity in the spherical polymer particles. The nonionic surfactants having an HLB in the range of about 1 to about 10 are classified as oil-soluble or monomer-soluble.

The surfactant is normally mixed with the monomer or monomers to be polymerized prior to being formed into discrete droplets. The nonionic surfactants useful for the purposes of the invention are those falling within the following generic classes and having an HLB in the broad range given above: (1) polyoxyethylene alkylphenols; (2) polyoxyethylene alcohols; (3) polyoxyethylene esters of fatty acids; (4) polyoxyethylene alkylamines; (5) polyoxyethylene alkylamides; (6) polyol surfactants including polyglycerol esters; and (7) polyalkylene oxide block copolymers. As examples of surfactants in the above classes having the appropriate HLB there may be named the following: sorbitan trioleate; sorbitan tristearate; polyoxyethylene sorbitol hexastearate; lactylated mono- and diglycerides of fat-forming fatty acids, ethylene glycol fatty acid ester; mono- and diglycerides from the glycerolysis of edible fats; propylene glycol fatty acid ester; propylene glycol monostearate; sorbitan sesquioleate; polyoxyethylene sorbitol 4.5 oleate; glycerol monostearate; decaglyceryl tetraoleate triglyceryl monooleate; sorbitan monooleate; sorbitan monolaurate; sorbitan partial fatty esters; high-molecular-weight fatty amine blend; sorbitan monostearate; diethylene glycol fatty acid ester; polyoxyethylene (2) stearyl ether; polyoxyethylene (2) oleyl ether; polyoxyethylene sorbitol beeswax derivative; polyoxyethylene (2) cetyl ether; diethylene glycol monolaurate (soap-free); sorbitan monopalmitate; high-molecular-weight amine blend; sorbitan monooleate polyoxyethylene ether mixed fatty and resin acids blend; polyoxypropylene mannitol dioleate; polyoxyethylene sorbitol lanolin derivative; sorbitan monolaurate; polyoxyethylene sorbitol esters of mixed fatty and rsin acids; polyoxyethylene fatty acid; polyoxyethylene sorbitol oleate; polyoxyethylene sorbitan monostearate; polyoxyethylene sorbitol tallow esters; polyoxyethylene sorbitol tall oil; polyoxyethylene lauryl ether; polyoxyethylene sorbitan monooleate; polyoxyethylene sorbitol hexaoleate; polyoxyethylene sorbitan tristearate; and polyoxyethylene sorbitan trioleate.

The above compounds have a multiplicity of functional groups and accordingly, a very large number of modifications is possible. Mixtures of said compounds can also be used, for example, mixtures of sorbitan monooleate and sorbitan trioleate. Usually the amount of nonionic surfactant employed will be in the range of about 0.005% to about 10% by weight, based on the weight of the monomer or monomers to be polymerized. Preferably, an amount of surfactant in the range of 0.1 to 5.0 by weight is employed.

Useful nonionic surface active agents preferably have an HLB number of less than 10 and include a variety of polyethers such as polyoxyethylene, sorbitol laurate, polyoxyethylene lauryl ether, polyoxyethylated fatty alcohols, polyoxyethylene condensation products of amide esters, polyoxyethylene stearates, polyoxyethylene esters of fatty and resin acids, alkylaryl polyether alcohols; partly esterified poly alcohols such as glycerol, monostearate, diethylene glycol laurate, sorbitan ester of fatty acids, diethylene glycol stearates and laurates; polyethanol amine condensates of fatty acids; alcohol amine fatty acid condensates and the like. A typical useful class of these nonionic materials are materials of the formula

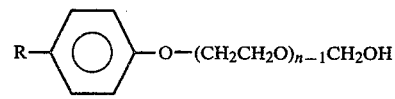

where R is an alkyl radical containing 6 to 12 carbon atoms as nonyl, octyl, isooctyl and the like. In the formula n represents the number of molds of ethylene oxide. The amount of ethylene oxide based on the weight of alkyl phenyl may be varied from about 20 to about 90 percent ethylene oxide, more normally about 40 to about 70 weight percent. Such materials include, for example, nonylphenoxy poly(ethyleneoxy)ethanol as representative of alkylaryl polyether nonionic agents. Also included are alkylaryl polyether alcohols, polyoxyethylene sorbitan monoesters as the laurate and the like. Particularly useful surfactants include sorbitan esters and phosphoric acid esters having HLB values of less than 10. Phosphoric acid esters include both alkyl and aryl esters. A group of compounds found to be very useful include sorbitan monolaurate, sorbitan monostearate, sorbitan monooleate, phenyl phosphoric acid ester, polyoxyethylene sorbitan (4) monostearate, polyoxyethylene sorbitan (5) monooleate, sorbitan tristearate, and sorbitan esters of palmitic and stearic acid.

In the practice of the invention, the polymerization reactors may be either batch, semi-batch or continuous. The agitation may be any agitation sufficient to maintain the slurry and obtain effective heat transfer including, for example, helical agitators, pitched turbines and the like. A useful temperature range is from the range of 30° C. to 90° C. at about 1 atmosphere. Normally polymerization time is from about 5 to 12 hours.

Typical embodiments representing the practice of the invention will be found in the following Examples.

EXAMPLE 1

89 weight parts of benzene, 11 weight parts of acrylic acid, 1.3 weight parts per one hundred weight parts, (phm) of acrylic acid of trimethylolpropane diallyl ether, 0.6 phm of lauryl peroxide, and 1.0 phm of sorbitan monostearate (HLB 4.7) were charged to a reactor. The reactor was heated to 65° C. and the polymerization conducted over an 8 hour period. The poly(acrylic acid) was isolated from the reaction mixture by filtration and dried at 110° C. The viscosity of the polymerization slurry was satisfactory. The dried product was found to have no gel, residual benzene of only 76 ppm and a mucilage viscosity at 1% solution of 70,000 cps.

There were no unswollen gel particles in the mucilage and the residual benzene content was excellent.

EXAMPLE 2

84 weight parts of cyclohexane, 16 weight parts of acrylic acid, 1.3 phm of trimethylolpropane diallyl ether, 0.1 phm of di-(2-ethylhexyl) peroxy dicarbonate, and 2 phm of phenyl phosphoric acid ester (HLB 3) were charged to a reactor and the polymerization conducted for 7 hours at 60° C. The polymerization slurry had a satisfactory viscosity. The resulting poly(acrylic) acid was separated from the slurry and dried at 100° C. for 4 hours. The mucilage viscosity at 1% was 89,000 cps and there were no unswollen gel particles in the mucilage.

EXAMPLE 3

85 weight parts of mineral spirits, 15 weight parts of acrylic acid, 1.3 phm of trimethylolpropane diallyl ether, 0.2 phm of di-(2-ethylhexyl) peroxy dicarbonate, and 2 phm of sorbitan monolaurate were charged to a reactor and polymerized at 60° C. for 7 hours. The viscosity of the slurry was satisfactory and there were no unswollen gel particles in the mucilage.

These Examples all illustrate that when a dispersant having an HLB numer of less than 10 is used, that flocculation is eliminated or substantially reduced, the viscosity of the slurry is decreased, polymer build-up on reactor surfaces is decreased, better control of particle size is obtained and faster drying polymers are obtained to provide products containing minimum amounts of the reactor solvent. Further advantages are in decreasing the amount of polymer gels. Examples of polymerizations that are not satisfactory when conducted with dispersants having HLB values greater than 10 are found in the following Examples.

EXAMPLE 4

89 weight parts of benzene, 11 weight parts acrylic acid, 1.3 phm of trimethylolpropane diallyl ether, 0.1 phm of di-(2-ethylhexyl) peroxy dicarbonate, and 2.0 phm acid of an organic ester of phosphoric acid, (Hostaphat K0380 supplied by American Hoechst Corp.) (HLB 14), were charged to a reactor and the polymerization conducted at 60° C. for 8 hours. The resulting slurry was excessively viscous and an unsatisfactory polymerization was obtained whereby the polymer was not readily recovered and was not satisfactorily dried in a reasonable period of time, and large amounts of solvent remained in the polymer.

EXAMPLE 5

84 weight parts of cyclohexane, 16 weight parts acrylic acid, 1.3 phm of trimethylolpropane diallyl ether, 0.1 phm of di-(2-ethylhexyl) peroxy dicarbonate, and 2.0 phm acid of polyoxyethylated sorbitan monolaurate (HLB 13.3) were charged to a reactor and polymerized at 60° C. for 7 hours. The resulting slurry was excessively viscous and there was an excessive amount of unswollen gel in mucilages prepared from 1% of the poly(acrylic acid) in water, which had a viscosity of only 40,000 cps.

When this Example was repeated with a condensate of ethylene oxide with a condensation product of propylene oxide with propylene glycol, (Pluronic L61 supplied by BASF Wyandotte Corp.) (HLB 16), similar unsatisfactory results were obtained.

EXAMPLE 6

81 weight parts of methylene chloride, 9 weight parts of acrylic acid, 1.8 phm of trimethylolpropane diallyl ether, 1.0 phm of sorbitan monolaurate and 0.6 phm of di-(2-ethylhexyl) peroxy dicarbonate per hundred weight parts of acrylic acid were charged to a reactor and polymerized at 40° C. for 8 hours at one atmospheric pressure with a turbine agitator at 140 rpm. The polymerized slurry had a satisfactory viscosity and there was no flocculation or undue polymer build-up. About 99 weight percent of the monomers were converted to polymer. Mucilages in water of the polymer were prepared at concentrations of 1.0%, 0.5% and 0.2 weight percent. There were no unswollen gel particles in the mucilage and the respective viscosities were 62,000 cps, 43,000 cps and 27,000 cps.

These Examples clearly set forth the improvement and advantages obtained when the polymerizations are conducted with a dispersant having an HLB value of less than 10, whereby improved viscosity during polymerization is obtained, decreased amounts of undesirable gel are observed and the resulting isolated polymers are readily dried to low contents of polymerization solvent.

We claim:

1. A method for polymerizing olefinically unsaturated carboxylic acids containing at least one activated carbon to carbon olefinic double bond and at least one carboxyl group in an organic media consisting essentially of organic liquids in which said carboxylic acids are at least partially soluble, and which are substantially a nonsolvent for the polymers of said carboxylic acids, in the presence of free radical forming catalyts and nonionic surface active agents having HLB values in the range of about 1 to about 10.

2. A method of claim 1 wherein in said carboxylic acid, said olefinic double bond is in the alpha-beta position with respect to a carboxyl group, or is part of a terminal methylene group, and said surface active agent is selected from the group consisting of (1) polyoxyethylene alkylphenols; (2) polyoxyethylene alcholols; (3) polyoxyethylene esters of fatty acids; (4) polyoxyethylene alkylamines; (5) polyoxyethylene alkylamides; (6) polyol surfactants including polyglycerol esters; (7) polyalkylene oxide block copolymers, (8) phosphoric acid esters, and mixtures thereof.

3. A method of claim 2 wherein said carboxylic acid is selected from the group consisting of acrylic acid, methacrylic acid, and maleic acid.

4. A method of claim 3 wherein said carboxylic acid is acrylic acid present in amounts of greater than 40 weight percent and from 0 to 60 weight percent of at least one other vinylidene monomer containing at least one $CH_2=CH<$ group copolymerized therewith and said organic media has a solubility parameter of from 5 to 10 $(cal/cm^3)^{\frac{1}{2}}$ and a dielectric constant of 1.7 to 9.5.

5. A method of claim 4 wherein said acrylic acid is present in amount greater than 70 weight percent and there is present less than 5 weight percent of a polyfunctional cross-linking vinylidene monomer containing at least two terminal $CH_2<$ groups.

6. A method of claim 5 wherein said organic liquid is a hydrocarbon containing 6 to 8 carbon atoms, said nonionic surface active agent has an HLB in the range of about 2 to about 6 and said cross-linking vinylidene monomer is selected from the group consisting of allyl pentaerythritol, trimethylolpropane diallylether and allyl sucrose.

7. A method of claim 6 wherein said surface active agent is present in amount of about 0.1 to about 5% by weight and is selected from the group consisting of sorbitan esters and phosphoric acid esters.

8. A method of claim 7 wherein there is present less than 30 weight percent of an acrylic acid ester of the formula

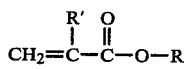

wherein R' is hydrogen, methyl or ethyl and R is an alkyl group containing 1 to 30 carbon atoms and the sorbitan esters are selected from the group consisting of sorbitan laurate, stearate, oleate and palmitate.

9. A method of claim 8 wherein there is present less than 30 weight percent of an acrylic acid ester of the formula

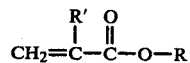

wherein R' is hydrogen, methyl or ethyl and R is an alkyl group containing 1 to 30 carbon atoms and the phosphoric acid ester is phenyl phosphoric acid.

10. A method of claim 9 wherein R' is hydrogen or methyl and R is an alkyl group containing 2 to 20 carbon atoms.

11. A method of claim 4 wherein said organic media is ethylene chloride.

12. A method of claim 8 wherein said organic media is methylene chloride.

* * * * *